(12) United States Patent
Eberl et al.

(10) Patent No.: US 6,822,772 B2
(45) Date of Patent: Nov. 23, 2004

(54) HOLOGRAPHIC DISPLAY

(75) Inventors: Heinrich A. Eberl, Probstried (DE);
Hans-Georg Leis, Esslingen (DE);
Bernhard Straub, Starzach (DE);
Holger Wenkei, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/333,019

(22) PCT Filed: Jun. 30, 2001

(86) PCT No.: PCT/EP01/07511
§ 371 (c)(1),
(2), (4) Date: Jul. 10, 2003

(87) PCT Pub. No.: WO02/06864
PCT Pub. Date: Jan. 24, 2002

(65) Prior Publication Data
US 2004/0100670 A1 May 27, 2004

(30) Foreign Application Priority Data
Jul. 17, 2000 (DE) .......................................... 100 35 068

(51) Int. Cl.[7] ................................................ G02B 5/32
(52) U.S. Cl. ............................. 359/15; 359/9; 359/22; 359/32; 359/1
(58) Field of Search ................................. 359/22, 15, 9, 359/32, 1, 25; 340/461

(56) References Cited

U.S. PATENT DOCUMENTS

| | | | |
|---|---|---|---|
| 3,619,026 A | * 11/1971 | Cindrich | ........................ 359/25 |
| 4,790,613 A | 12/1988 | Moss | |
| 5,734,485 A | 3/1998 | Buchkremer et al. | |
| 6,088,140 A | 6/2000 | Klug et al. | |

FOREIGN PATENT DOCUMENTS

| | | |
|---|---|---|
| DE | 37 35 983 A1 | 5/1989 |
| DE | 42 11 728 A1 | 10/1993 |
| DE | 198 25 192 A1 | 12/1999 |
| EP | 0 389 123 A2 | 9/1990 |
| FR | 2 699 289 | 6/1994 |

* cited by examiner

Primary Examiner—Fayez Assaf
(74) Attorney, Agent, or Firm—Crowell & Moring LLP

(57) ABSTRACT

The invention relates to a holographic display for storing and reducing a spatial structure, having a holographic screen forming the master hologram, and having a projection device which illuminates the holographic screen in order to reproduce the spatial structure. The invention, for the holographic display to be constructed from a plurality of holographic screens which are respectively assigned to a dedicated projection device.

18 Claims, 2 Drawing Sheets

HOLOGRAPHIC DISPLAY

Figure 1:
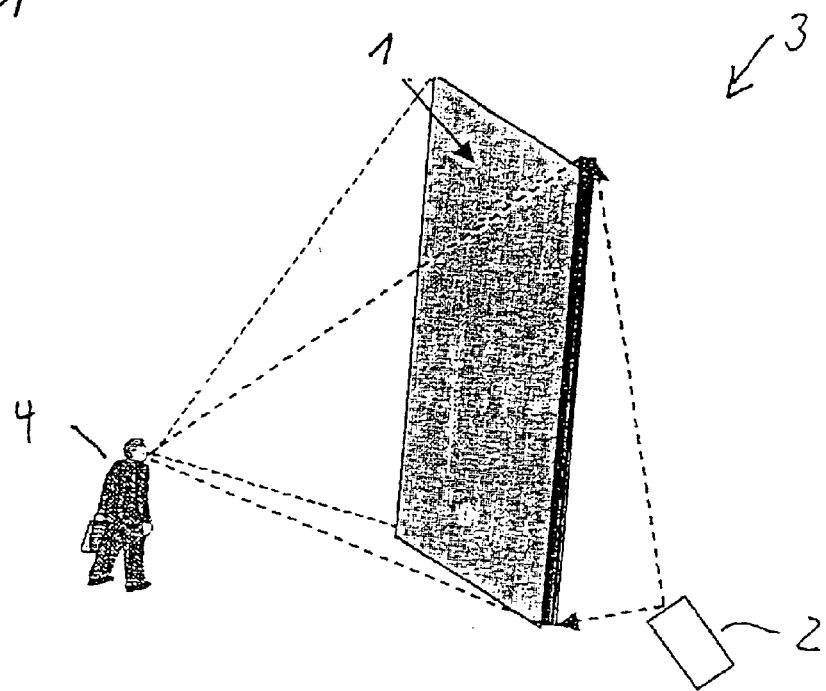
Figure 1:
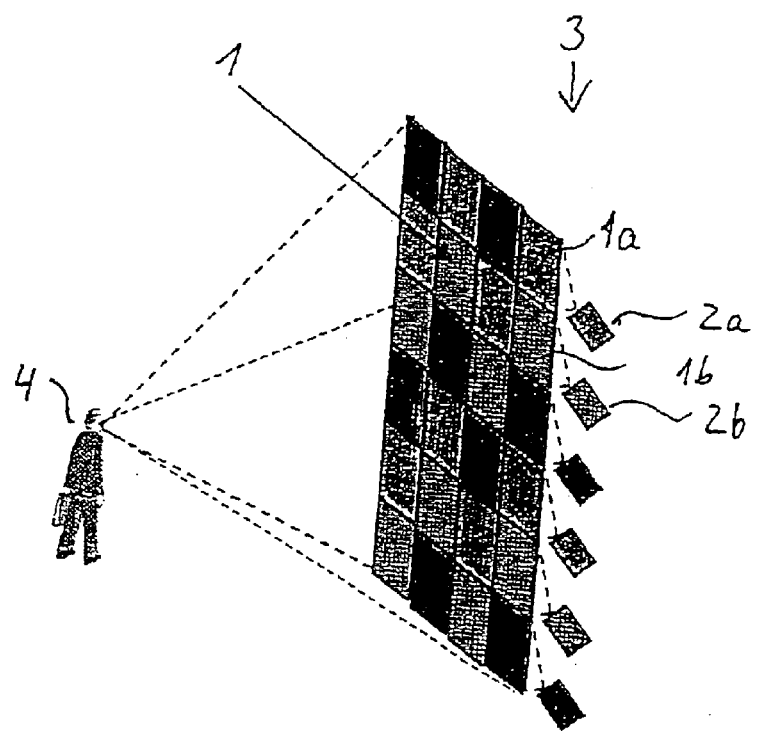

The invention relates to a holographic display in accordance with the generically determinative features of claim 1.

In a generic holographic display which is disclosed in DE 3735983 C2, for the purpose of recording a hologram image with the aid of which a hologram image can be obtained behind the hologram plate, the surface of a hologram plate being illuminated by a reference laser light of a spherical wave and the rear of the hologram plate being illuminated by an object laser light which is scattered by a diffuser and transilluminates an object, there is a superimposition of the light bundles on the hologram photographic dry plate such that interference fringes are recorded which extend in a direction of the thickness of the hologram emulsion layer. In order to reproduce the hologram image thus recorded, the hologram plate is illuminated by the light of an optical source in the same direction as the reference light which was used to record the hologram. Only the light of a wavelength which satisfies the Bragge condition is reflected and so a virtual image of the object is produced behind the holoplate. In order to generate volume holograms, use is made of a storage medium for holographic recordings which is exposed with an object beam and reference beam. Interference between object and reference beams inside the hologram volume produces a sequence of Bragg planes. The ability of the volume holograms to store a plurality of images simultaneously permits the production of coloured holograms. The recording of holograms requires lasers which can emit the three primary colours of blue, green and red as accurately as possible. The three beam clusters simultaneously expose the recording medium at equal angles. Three holograms are stored simultaneously in the volume hologram after the exposure. The reproduction of the coloured hologram is served by the distinguishing feature, characteristic of volume holograms, that each partial hologram is to be reconstructed solely by the colour with which it was recorded. The reproduction is therefore performed best with the lasers already used in the recording. The three reconstructed colour separations are superimposed to form the coloured, faithful image if the colour components are correctly weighted.

It is disadvantageous in this type of holographic display that the requirements made of the recording technology and the projection device become more exacting as the screen area increases. In the case of front projection, the soiling, possible at any time, of the screen leads to impairment of viewing. Particularly in the case of reproduction, it is impermissible for the projector to move relative to the screen. Consequently, it is necessary to guarantee a stable, vibrationally isolated suspension. Moreover, the beam path can be interrupted by persons and objects. Despite folding of the beam path, the structure requires a substantial installation depth.

The object of the invention is to provide a holographic display for generating virtual images which can have a large screen area without worsening the image quality, it being possible for the screen area to have any desired surface.

According to the invention, the object is achieved by means of the features of claim 1. Advantageous refinements and developments of the subject matter of the invention are characterized by the features of the subclaims.

A substantial advantage of these refinements resides in that the display can have a large screen area without causing the image quality to suffer. The virtual image plane can be set such that the visual image distance is variable. A stereo representation is possible without spectacles. Furthermore, the holographic display has a full-colour representation with a high contrast performance even in daylight, this being independent of the shape and geometry of the virtual screen. The display is insensitive to extraneous light, and so a high contrast is provided even in daylight. The holographic display is flexible and can be accommodated in the most varied types of installation space. Furthermore, a plurality of pictorial representations are obtained simultaneously in different directions of view.

Figure 2:
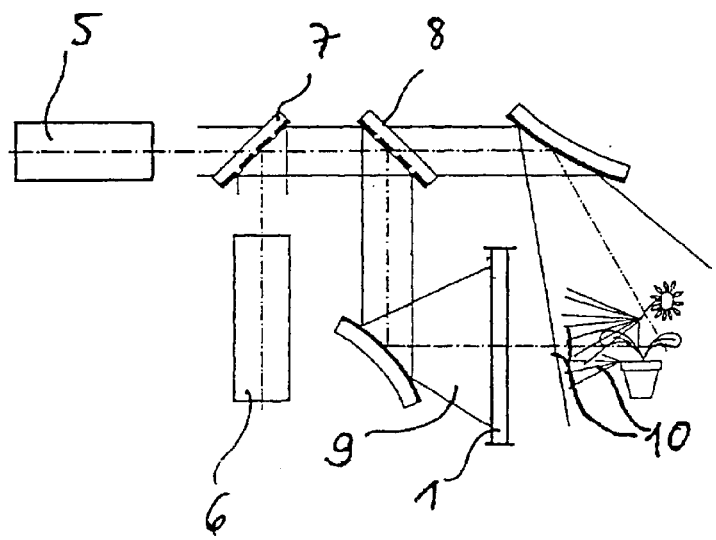
Figure 3:
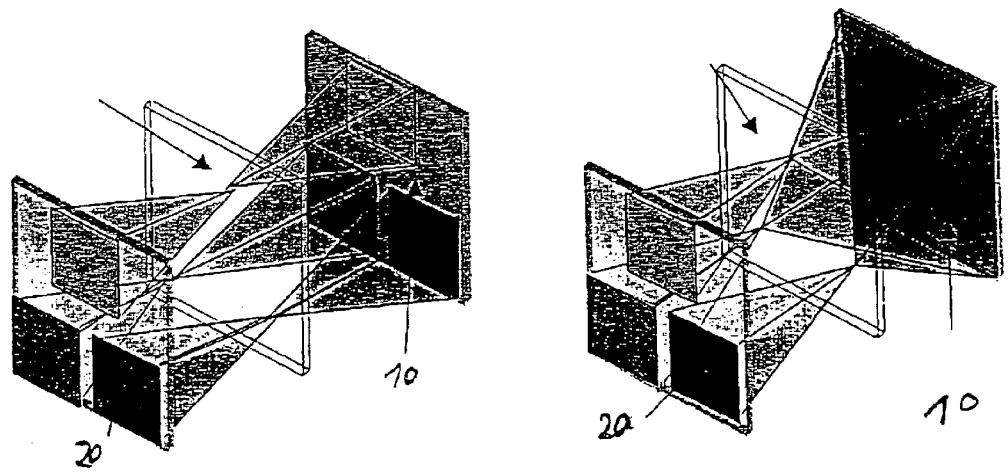

The invention is explained in more detail with the aid of an exemplary embodiment in conjunction with a description of the figures, in which:

FIG. 1 shows a schematic of a conventional holographic display and of a holographic display according to the present invention, FIG. 2 shows an experimental arrangement for recording coloured holograms, and a schematic of a section of the standing waves in the holographic plate; and FIG. 3 shows storage of the RGB holograms in one hologram volume and in separate hologram volumes.

FIG. 1 shows at the top a schematic of a conventional holographic display 3. The holographic display 3 has a screen 1 that forms the master hologram and is illuminated from behind by a video projector 2 using back-projection. So that the viewer 4 can view the hologram, the video projector 2 must be arranged as the reference projector for recording the hologram. The lower image shows a schematic of a holographic display 3 according to the present invention. The holographic display 3 is constructed from a plurality of holographic screens 1a, 1b, . . . , that are respectively assigned a dedicated projection device 2a, 2b, . . . . In order to keep the display 3 small for the purpose of flexible application, the projection devices can be designed as an array of light sources that can be modulated in a punctiform fashion. It is possible to make use as projection devices of various projection light sources such as, for example, LCD, LEP, OLED and CRT. The holographic screens 1a, 1b, . . . of the holographic display 3 have an array of holographically optical elements that collect the light of the projection devices 2a, 2b, . . . , and each pixel is projected into the corresponding virtual image via the assigned element of the array of holographically optical elements. The virtual images are independent of the position of the individual holograms and thus of the holographic display, but are fixed during the recording of the master hologram. This master hologram can be copied for mass production. The virtual images are therefore independent of the screen position and can be defined such that they are situated in the optimal visual range and at a suitable distance relative to the direction of viewing. It is possible to store in the hologram various image planes (at least two) that can be fetched by suitable techniques, for example, by means of different projection devices. Also conceivable for this purpose is a type of polarizer that renders the different image planes capable of display via a selection of the directions of polarization. By combining a flexible display on plastic substrates and holographic layers as optical elements, it is possible to achieve flat and curved displays with virtual images. The advantages of flat display screens and those of projection displays are utilized with this sandwich technique. Thus, flat displays that can be adapted flexibly to curved surfaces are obtained with a very small installation space. Moreover, it can be predetermined that the virtual images are visible at a suitable distance and at right angles to the direction of view. The individual holographically optical elements of the array comprise three holograms that are sensitive in the red or green or blue. The holographic display comprises red-green-blue holograms, whose recording technique is described in FIG. 2. The direction of projection, the angle of view and the virtual viewing distance are set during production. The virtual image of the white miniature display screen comprising red, green and blue pixel elements is located at predefined distances. FIG. 3 shows the storage of the red, green, blue (RGB) holograms in a hologram volume 10, in the right-hand image or in separate hologram volumes 10 with a greatly reduced hologram area, in the left-hand image. The material for the display is, for example, a flexible, transparent high-resolution, optically sensitive film made from photopolymer with a layer thickness of approximately $20\mu$.

FIG. 2 shows an experimental arrangement for recording a coloured hologram. The ability of volume holograms to store a plurality of images simultaneously permits the production of coloured holograms. The recording of the holograms requires as light sources lasers 5, 6 that emit the three primary colours of blue, green, red. The light of the argon-ion laser emits green and blue light, and the light of the helium-neon laser emits red light. The argon-ion laser 5 emits green and blue light that is mixed at the partially transmitting mirror 7 with the red light of the helium-neon laser 6. The divider mirror 8 splits the incident beams respectively into the object beam 10 for illuminating the object and the reference beam 9. The reference beam 9 strikes the hologram plate 1 from the front, while the object beam 10 strikes the hologram plate 1 from behind after diffuse reflection at the object. The object beam 10 and reference beam 9 interfere in the volume of the hologram plate 1; the Bragg planes produced by interference of object and reference beam fill the hologram volume. The reproduction of the coloured hologram is served by the distinguishing feature characteristic of volume holograms that each partial hologram is to be reconstructed solely by the colour with which it was recorded. Consequently, the reproduction is best performed with the light sources 5, 6 already used in the recording. The three reconstructed colour separations are superimposed to form the coloured, faithful image.

The holographic display can be applied as a virtual 3D combination instrument in a motor vehicle, as a dualdistance display for the office and entertainment applications, as a TV or as a monitor of a computer or also for application as a miniature display screen for IT applications such as mobile phones. 3D-CAD and 3D computer games are conceivable for software applications.

What is claimed is:

1. Holographic display for storing and reproducing a spatial structure, having a holographic screen forming the master hologram, and having a projection device which illuminates the holographic screen in order to reproduce the spatial structure, wherein the holographic display is constructed from a plurality of holographic screens which are respectively assigned to a dedicated projection device, each of the plurality of holographic screens comprising an array of holographically optical elements and the array of holographically optical elements of at least one of the plurality of holographic screens comprise three holograms which are respectively sensitive to red, green and blue light.

2. Holographic display according to claim 1, wherein the holographic screen of a holographic display has an array of holographically optical elements which collect the light of the dedicated projection devices and projects each pixel of the light of the dedicated projection devices onto an array, arbitrarily arranged in space, of identical holographic screens.

3. Holographic display according to claim 2, wherein the visual image distance is set when producing the holographic display.

4. Holographic display according to claim 2, wherein the holographic display is flexible by virtue of the fact that a holographic layer is arranged as optimal optical element on a plastic substrate.

5. Holographic display according to claim 2, wherein a plurality of image planes are stored in the holographic display.

6. Holographic display according to claim 1, wherein the visual image distance is set when producing the holographic display.

7. Holographic display according to claim 6, wherein a plurality of image planes are stored in the holographic display.

8. Holographic display according to claim 1, wherein a plurality of image planes are stored in the holographic display.

9. Holographic display according to claim 8, wherein the various image planes can be fetched by selecting suitable projection devices.

10. Holographic display for storing and reproducing a spatial structure, having a holographic screen forming the master hologram, and having a projection device which illuminates the holographic screen in order to reproduce the spatial structure, wherein the holographic display is constructed from a plurality of holographic screens which are respectively assigned to a dedicated projection device, and the projection devices of the holographic display have an array of light sources which are modulated in a punctiform fashion.

11. Holographic display according to claim 10, wherein the holographic screen of a holographic display has an array of holographically optical elements which collect the light of the dedicated projection devices and projects each pixel of the light of the dedicated projection devices onto an array, arbitrarily arranged in space, of identical holographic screens.

12. Holographic display according to claim 11, wherein the holographic display is flexible by virtue of the fact that a holographic layer is arranged as optical element on a plastic substrate.

13. Holographic display according to claim 11, wherein a plurality of image planes are stored in the holographic display.

14. Holographic display according to claim 10, wherein the visual image distance is set when producing the holographic display.

15. Holographic display according to claim 10, wherein the holographic display is flexible by virtue of the fact that a holographic layer is arranged as optical element on a plastic substrate.

16. Holographic display according to claim 10, wherein a plurality of image planes are stored in the holographic display.

17. Holographic display for storing and reproducing a spatial structure, having a holographic screen forming the master hologram, and having a projection device which illuminates the holographic screen in order to reproduce the spatial structure, wherein the holographic display is constructed from a plurality of holographic screens which are respectively assigned to a dedicated projection device, each of the plurality of holographic screens comprising an array of holographically optical elements and the array of holographically optical elements of at least one of the plurality of holographic screens comprise three holograms which are respectively sensitive to red, green and blue light, and a holographic layer of the holographic display is an optical element on a plastic substrate such that the holographic display is adapted flexibly to curved surfaces.

18. Holographic display for reproducing a spatial structure with the aid of a multiplicity of holographic screens, which are assigned in each case to a dedicated projection device with red, green, blue pixels, the holographic screens having an array of holographically optical elements, and each pixel being assigned a holographically optical element in such a way that each pixel is projected via the assigned element into a corresponding virtual image.

* * * * *